//  US005528467A

United States Patent [19]
Jiang

[11] Patent Number: 5,528,467
[45] Date of Patent: Jun. 18, 1996

[54] HEAD LIGHT STRUCTURE OF A CAR

[75] Inventor: Su-Jane Jiang, Tainan Hsien, Taiwan

[73] Assignee: Wang Chi Industrial Co., Ltd., Tainan, Taiwan

[21] Appl. No.: 533,196

[22] Filed: Sep. 25, 1995

[51] Int. Cl.$^6$ .................................................... B60Q 1/00
[52] U.S. Cl. ........................... 362/61; 362/267; 362/362; 362/310; 411/354
[58] Field of Search ............................ 362/61, 267, 362, 362/310; 411/354, 399

[56] References Cited

U.S. PATENT DOCUMENTS

| | | | |
|---|---|---|---|
| 4,604,679 | 8/1986 | Rolando et al. | 362/61 |
| 5,140,503 | 8/1992 | Lisak | 362/61 |
| 5,158,350 | 10/1992 | Sato | 362/61 |

*Primary Examiner*—Denise L. Gromada
*Assistant Examiner*—Alfred Basichas
*Attorney, Agent, or Firm*—Beveridge, DeGrandi, Weilacher & Young

[57] ABSTRACT

A head light structure of a car, including a protective housing consisting of a front and a rear housing, and a tail section consisting of a hollow tail end rearward extending from the rear housing and an elliptic cover. A leaf spring is disposed in the elliptic cover. A waterproof washer is disposed on a bottom of the elliptic cover for preventing external water from flowing to the wires or bulb in the elliptic cover. The elliptic cover is associated with the tail end of the rear housing by means of pressing the elliptic cover toward the tail end to be latched therewith with the leaf spring biased against a seat of a bulb to fix the same. The front housing is disposed with two inner pad ears each having a thread hole. The rear housing is disposed with two outer pad ears each having a circular hole, whereby the circular holes are first overlapped on the thread holes of the inner pad ears in an eccentric position and then the front and rear housings are adhered to each other, and thereafter, screws are passed through the circular holes and screwed into the thread holes to securely couple the front and rear housings with a fixing seat.

1 Claim, 7 Drawing Sheets

HEAD LIGHT STRUCTURE OF A CAR

BACKGROUND OF THE INVENTION

The present invention relates to a head light structure of a car.

FIGS. 1 to 3 show a conventional head light structure of a car, which includes a focusing lens 11, a protective housing 12 and a tail section 13.

The protective housing 12 consists of a front housing 121 and a rear housing 122. The front housing 121 is disposed with two pad ears 123 on two sides. Each pad ear 123 has a thread hole 124.

The tail section 13 includes a hollow cylindrical tail end 135 rearward extending from the rear housing 122. A spring member 133 is disposed in the tail end 135 and the tail end 135 is wrapped by a rubber cover 131.

The front and rear housings 121, 122 are first adjoined with each other by an adhesive agent and then screws are screwed into the thread holes 124 of the pad ears 123 to fix the front housing 121 on a fixing seat 14. The spring member 133 serves to abut against and fix a seat 134 of a bulb. The rubber cover 131 is formed with two holes for wires to pass therethrough.

Several shortcomings exist in the above conventional head light structure as follows:

1. The front and rear housings are adjoined together only by an adhesive agent. Such adhesive agent can hardly provide reliable adjoining effect and thus the front housing is apt to detach from the rear housing due to shocking or its own weight.
2. The tail end of the rear housing is wrapped by the rubber cover which is not provided with a waterproof design. Therefore, when raining or washing the car, external water can easily flow through the clearance between the rubber cover and the tail end into the interior thereof. This may cause short circuit of the wires and bulb in the tail end.

SUMMARY OF THE INVENTION

It is therefore a primary object of the present invention to provide a head light structure of a car, including a protective housing consisting of a front and a rear housing, and a tail section consisting of a hollow tail end rearward extending from the rear housing and an elliptic cover sealedly covering the tail end. A leaf spring is disposed on the elliptic cover for abutting against and fix the seat of the bulb. This simplifies the steps of first fastening the spring member in the tail end and then wrapping the tail end with the rubber cover and instead, only one step of fastening the elliptic cover into the tail end is required.

A waterproof washer is disposed on a bottom of the elliptic cover for preventing external water from flowing to the wires or bulb in the elliptic cover to cause short circuit.

It is a further object of the present invention to provide the above head light structure in which the front housing is disposed with two inner pad ears each having a thread hole. The rear housing is disposed with two outer pad ears each having a circular hole, whereby the circular holes are first overlapped on the thread holes of the inner pad ears in an eccentric position and then the front and rear housings are adhered to each other, and thereafter, screws are passed through the circular holes and screwed into the thread holes to securely couple the front and rear housings with a fixing seat. Therefore, the front and rear housings are not only associated with each other by the adhesive agent, but also by the binding force of the screws. Moreover, because the circular holes of the rear housing are previously eccentrically positioned slightly behind the thread holes of the front housing, when the screws are screwed into the thread holes, the rear housing is slightly shifted forward by the screws so as to more securely associate the front and rear housings together.

The present invention can be best understood through the following description and accompanying drawings, wherein:

DETAILED DESCRIPTION OF THE PREFERRED EMBODIMENT

Figure 1:
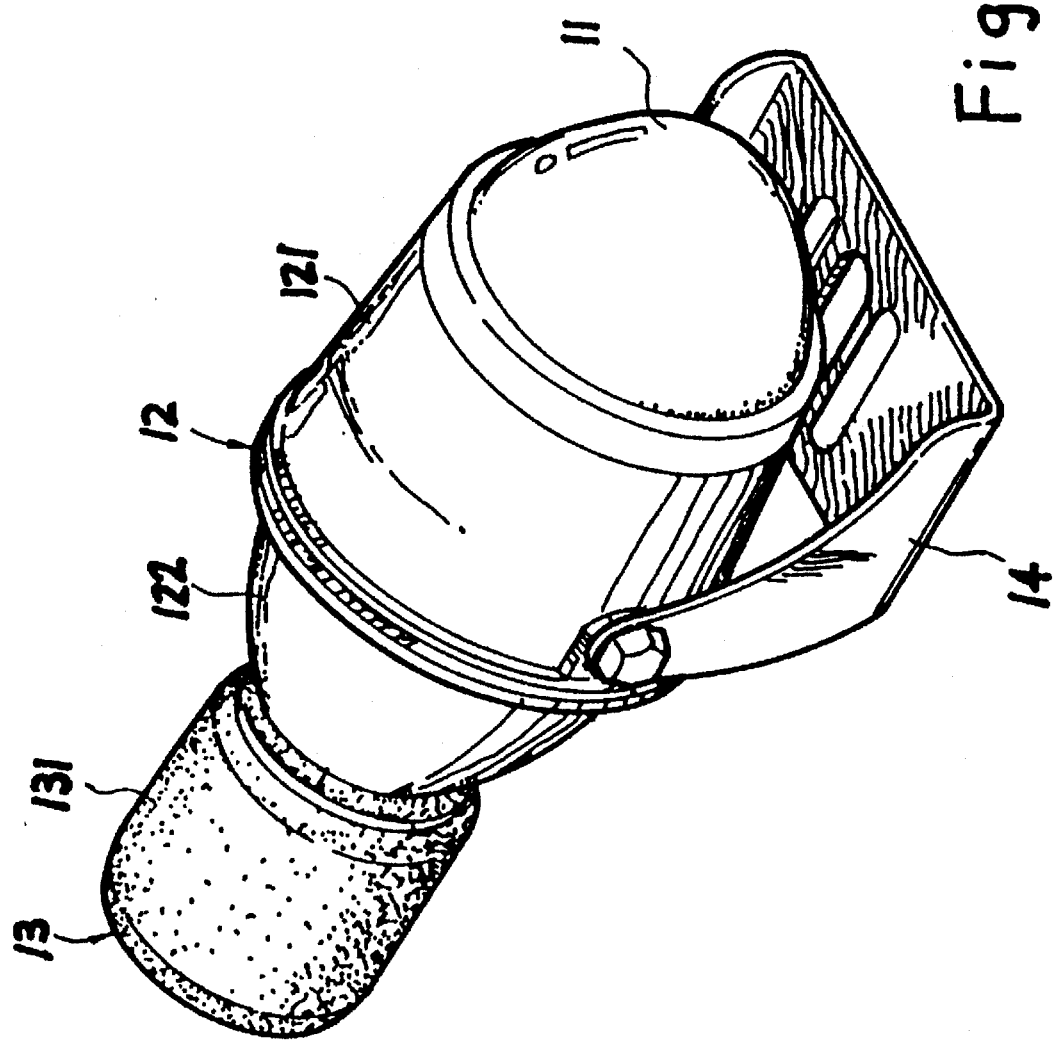
FIG. 1 is a perspective assembled view of a conventional head light structure of a car.
Figure 2:
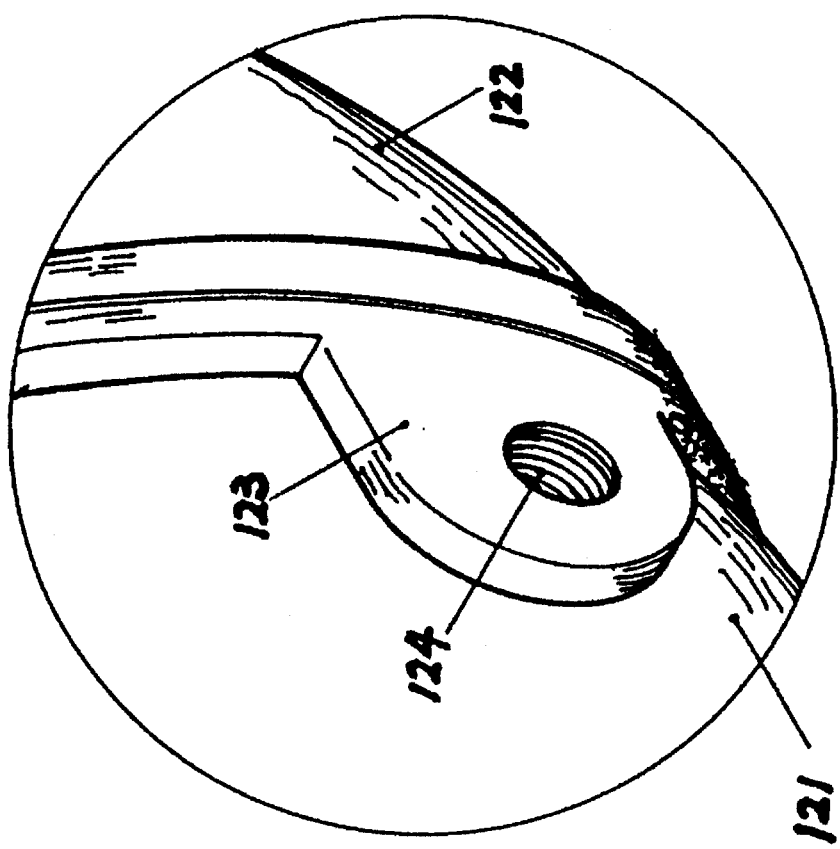
FIG. 2 is a perspective view showing the pad ear of the front housing of the conventional head light structure.
Figure 3:
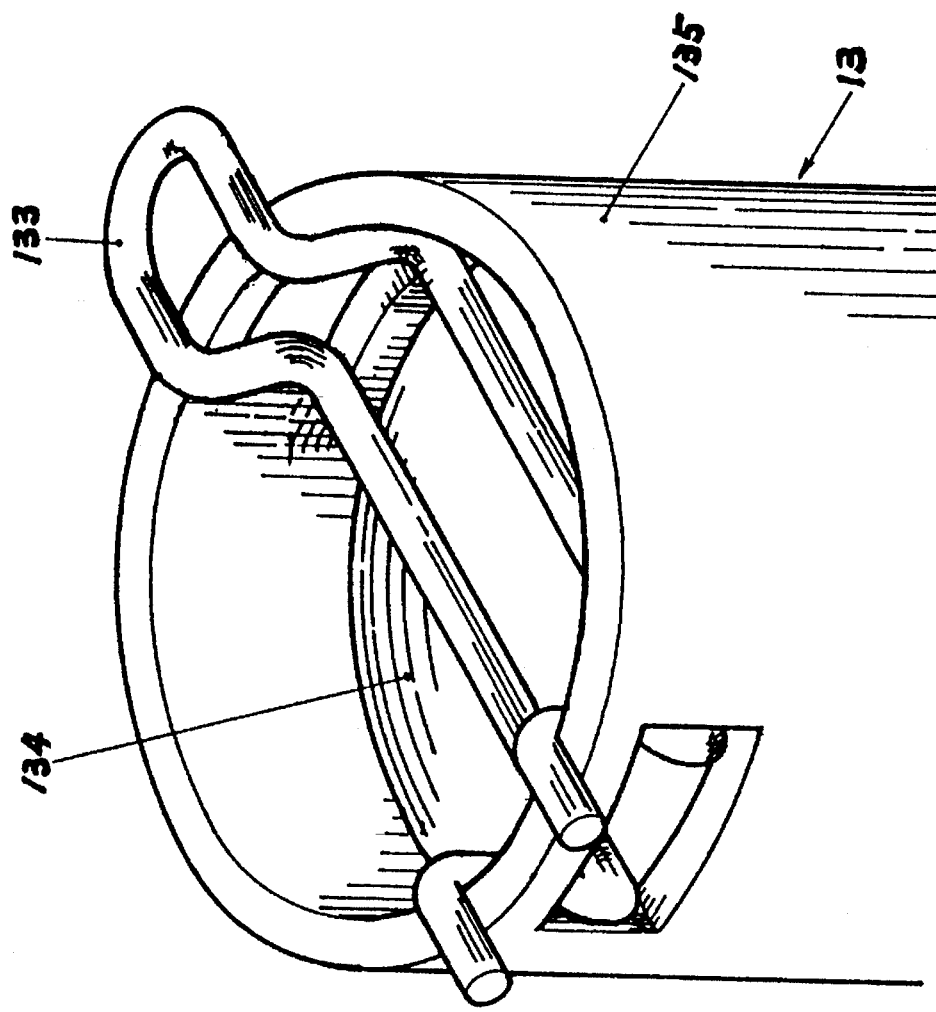
FIG. 3 is a perspective view showing the spring member of the conventional head light structure for fixing the seat of the bulb.
Figure 4:
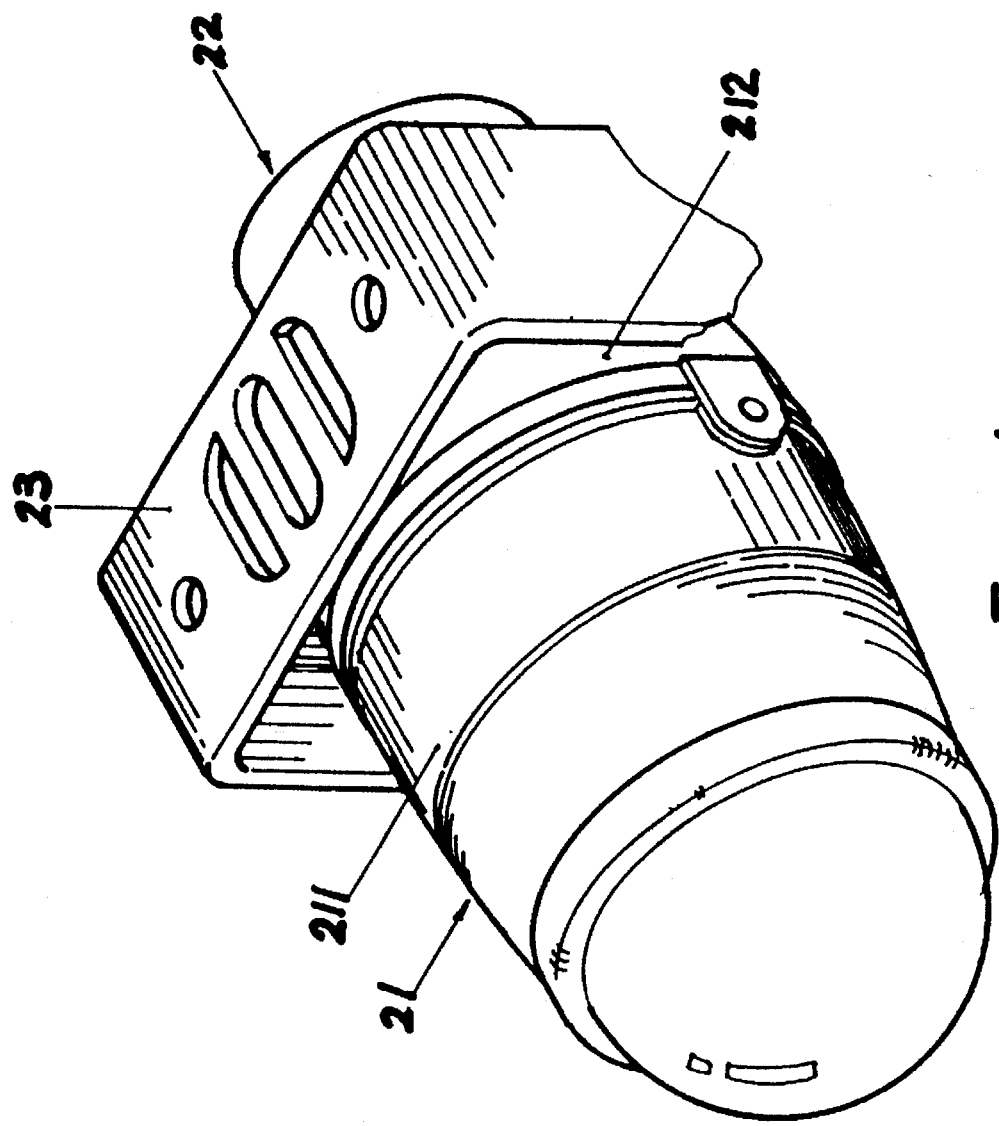
FIG. 4 is a perspective assembled view of the present invention.
Figure 5:
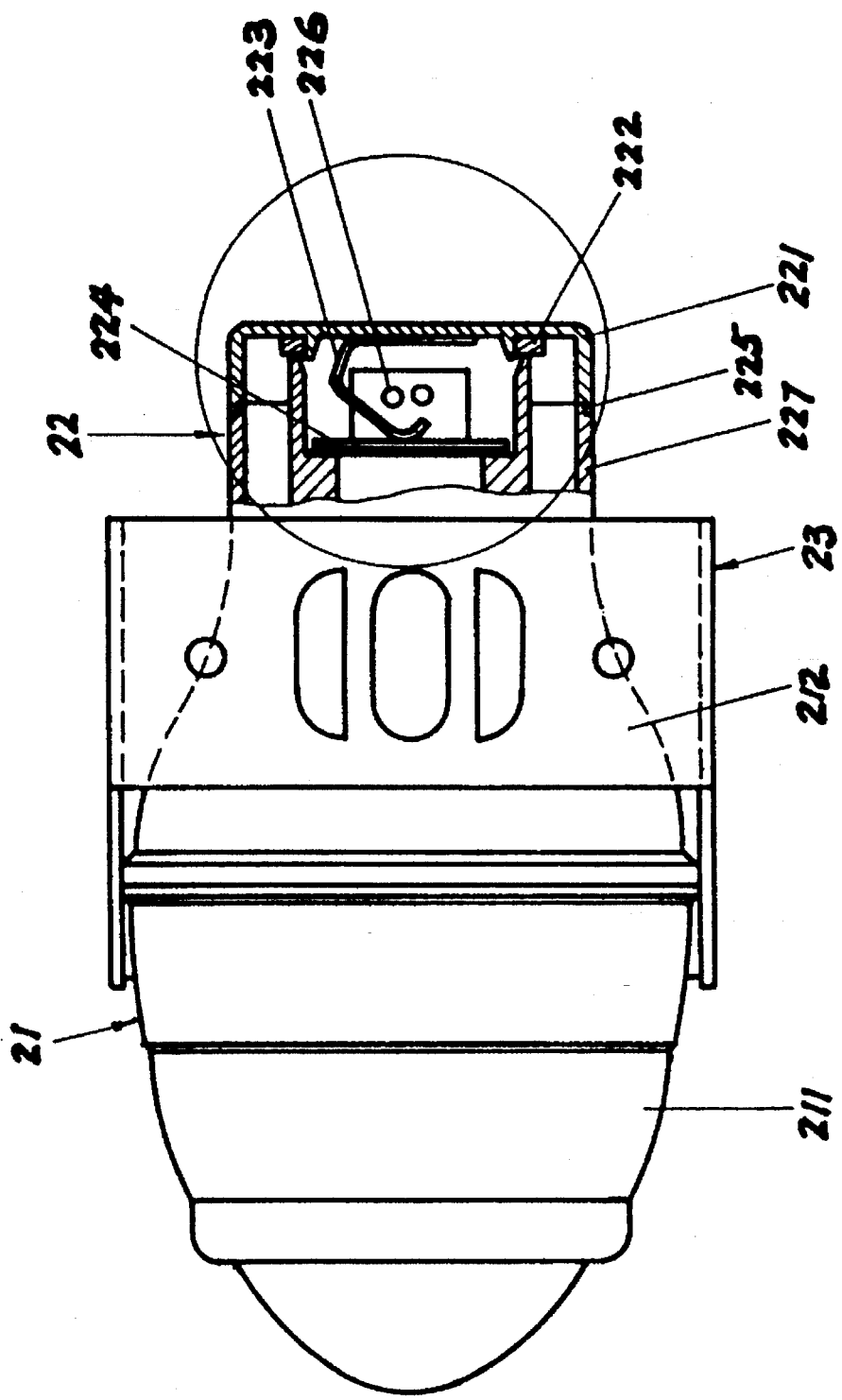
FIG. 5 is a partially sectional side view of the present invention.
Figure 6:
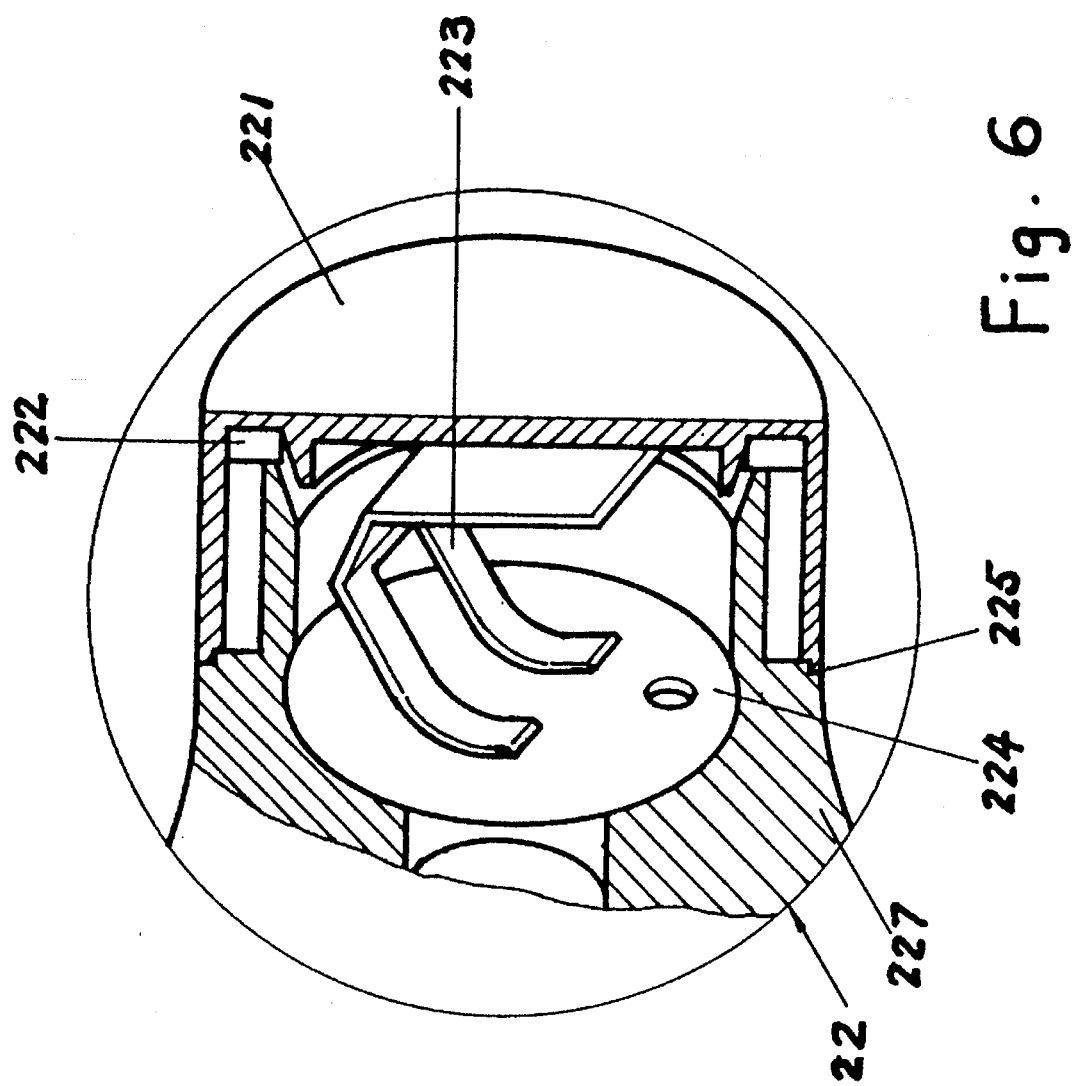
FIG. 6 is a perspective view showing the inner and outer pad ears of the front and rear housings of the present invention.

Please refer to FIGS. 4 to 6. The head light structure of the present invention mainly includes a protective housing 21 and a tail section 22. The protective housing 21 includes a front housing 211 and a rear housing 212. The front housing 211 is disposed with two inner pad ears 214 on two sides. Each inner pad ear 214 is formed with a thread hole 215. The rear housing 212 is disposed with two outer pad ears 213 on two sides. Each outer pad ear 213 is formed with a circular hole 216. When the front and rear housings 211, 212 are adjoined with each other by an adhesive agent, the circular holes 216 of the outer pad ears 213 are first overlapped on the thread holes 215 of the inner pad ears 214 in an eccentric position and then the front and rear housings 211, 212 are adhered to each other. Thereafter, screws are passed through the circular holes 216 and screwed into the thread holes 215 to couple the front and rear housings with a fixing seat. Because the circular holes 216 of the rear housing 212 are previously eccentrically positioned slightly behind the thread holes 215 of the front housing 211, when the screws are screwed into the thread holes 215, the rear housing 212 is slightly shifted forward by the screws so as to securely associate the front and rear housings 211, 212 together.

Figure 7:
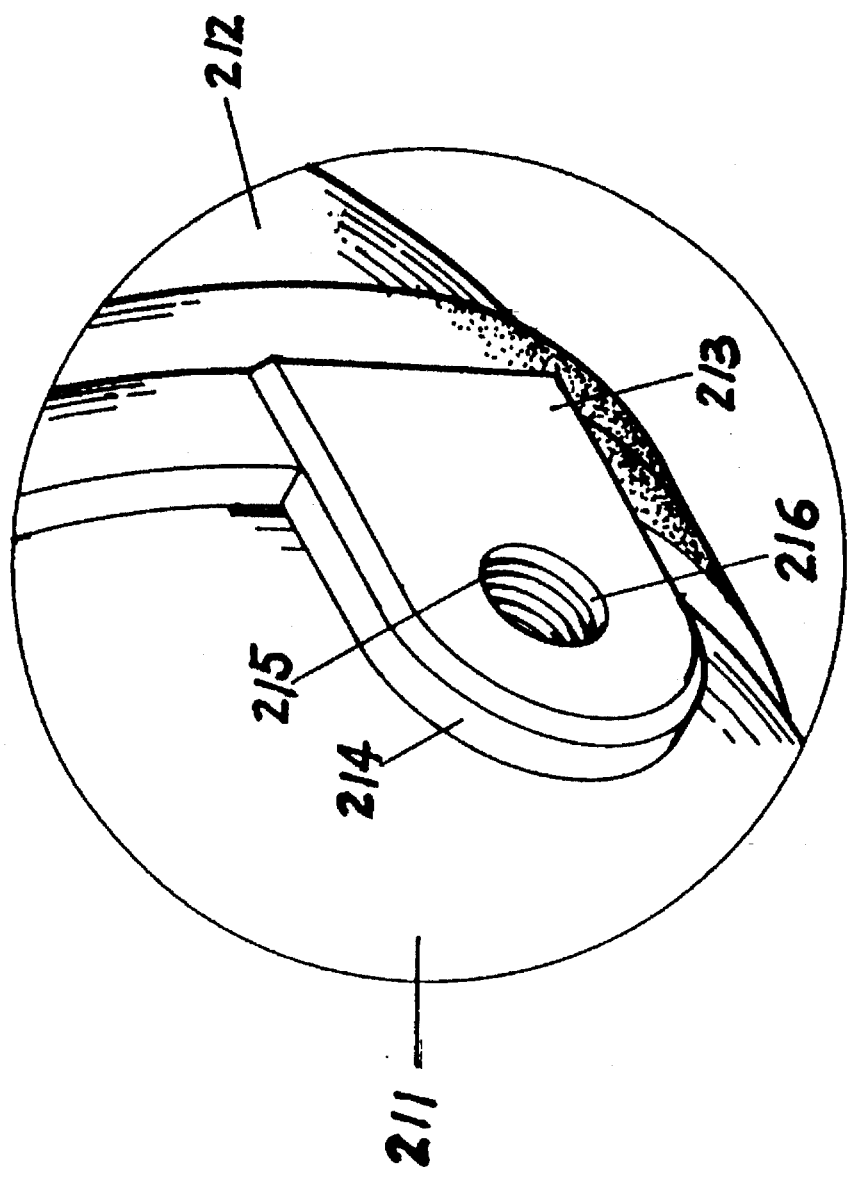
FIG. 7 is a sectional view showing the tail end and the elliptic cover of the present invention.

Please refer to FIGS. 5 and 7. The tail section 22 includes a hollow tail end 227 rearward extending from the rear housing 212, an elliptic cover 221, a leaf spring 223 disposed in the elliptic cover 221 and a waterproof washer 222. The inner periphery of the elliptic cover 221 is formed with a trapezoid step portion 225, whereby when the elliptic cover 221 is associated With the tail end 227 of the rear housing 212, the elliptic cover 221 is pressed toward the tail end 227 and latched therewith. At this time, the leaf spring 223 is biased against a seat 224 of a bulb to fix the same. The waterproof washer 222 is disposed on the bottom of the elliptic cover 221, whereby in case external water infiltrates through the clearance between the step portion 225 and the tail end 227, the washer 222 is able to stop the water from flowing to the wires or bulb in the elliptic cover 221. The elliptic cover 221 is formed with a through hole 226 for the wires to pass therethrough.

The above embodiment is only an example of the present invention and the scope of the present invention should not be limited to the example. Any modification or variation derived from the example should fall within the scope of the present invention.

What is claimed is:

1. A head light structure of a car, comprising a protective housing and a tail section, the protective housing including a front housing and a rear housing, wherein:

the front housing is disposed with two inner pad ears on two sides, each inner pad ear being formed with a thread hole;

the rear housing is disposed with two outer pad ears on two sides, each outer pad ear being formed with a circular hole, whereby when the front and rear housings are adjoined with each other by an adhesive agent, the circular holes of the outer pad ears are first overlapped on the thread holes of the inner pad ears in an eccentric position and then the front and rear housings are adhered to each other, and thereafter, screws are passed through the circular holes and screwed into the thread holes to couple the front and rear housings with a fixing seat;

the tail section includes a hollow tail end rearward extending from the rear housing and an elliptic cover, a leaf spring being disposed in the elliptic cover, an inner periphery of the elliptic cover being formed with a trapezoid step portion and an outer periphery of the tail end being formed with a corresponding trapezoid step portion, whereby when the elliptic cover is associated with the tail end of the rear housing, the elliptic cover is pressed toward the tail end and latched therewith with the leaf spring biased against a seat of a bulb to fix the same, a waterproof washer being disposed on a bottom of the elliptic cover for preventing external water from flowing to the wires or bulb in the elliptic cover to cause short circuit.

* * * * *